(12) United States Patent
Cho et al.

(10) Patent No.: US 7,261,417 B2
(45) Date of Patent: *Aug. 28, 2007

(54) THREE-DIMENSIONAL INTEGRAL IMAGING AND DISPLAY SYSTEM USING VARIABLE FOCAL LENGTH LENS

(75) Inventors: Gyoung Il Cho, Seoul (KR); Cheong Soo Seo, Seoul (KR); Tae Hyeon Kim, Taejon (KR)

(73) Assignees: Angstrom, Inc., Suwon (KR); Stereo Display, Inc., Anaheim, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 10/979,624

(22) Filed: Nov. 2, 2004

(65) Prior Publication Data

US 2005/0180019 A1 Aug. 18, 2005

Related U.S. Application Data

(63) Continuation-in-part of application No. 10/778,281, filed on Feb. 13, 2004, now Pat. No. 7,077,523, and a continuation-in-part of application No. 10/822,414, filed on Apr. 12, 2004, now Pat. No. 7,068,416, and a continuation-in-part of application No. 10/855,554, filed on May 27, 2004, now Pat. No. 6,970,284, and a continuation-in-part of application No. 10/855,715, filed on May 27, 2004, now Pat. No. 7,031,046, and a continuation-in-part of application No. 10/855,287, filed on May 27, 2004, now Pat. No. 6,934,072, and a continuation-in-part of application No. 10/857,796, filed on May 28, 2004, now Pat. No. 6,934,073, and a continuation-in-part of application No. 10/857,714, filed on May 28, 2004, and a continuation-in-part of application No. 10/857,280, filed on May 28, 2004, now Pat. No. 6,999,226, and a continuation-in-part of application No. 10/872,241, filed on Jun. 18, 2004, and a continuation-in-part of application No. 10/893,039, filed on Jul. 16, 2004.

(51) Int. Cl.
*G03B 21/00* (2006.01)
*G03B 21/20* (2006.01)
*G02B 26/00* (2006.01)
*G02B 27/14* (2006.01)
*G02B 5/08* (2006.01)

(52) U.S. Cl. .......................... 353/10; 353/94; 353/102; 353/122; 359/619; 345/6; 345/419

(58) Field of Classification Search ................... 353/10, 353/94, 102, 122; 359/290, 291, 292, 295, 359/298, 619, 631, 633, 851; 345/6, 419
See application file for complete search history.

(56) References Cited

U.S. PATENT DOCUMENTS

| 5,986,811 A * | 11/1999 | Wohlstadter ................. 359/626 |
| 6,304,263 B1 * | 10/2001 | Chiabrera et al. ........... 345/419 |
| 6,329,963 B1 * | 12/2001 | Chiabrera et al. ............. 345/6 |
| 2005/0057812 A1 * | 3/2005 | Raber .......................... 359/619 |

* cited by examiner

*Primary Examiner*—Melissa Jan Koval (57) ABSTRACT

A three-dimensional (3-D) display system using a variable focal length lens includes at least one two-dimensional (2-D) display device, configured to display at least one two-dimensional image. The display system also includes an array of micromirror array lenses optically coupled to the display device, each micromirror array lens of the array of micromirror array lenses placed at a different location with respect to the display device, configured to focus the at least one two-dimensional image from each different location to provide a three-dimensional (3-D) image. The advantages of the present invention include increased viewing angles and wide depth range of three-dimensional images.

23 Claims, 6 Drawing Sheets

THREE-DIMENSIONAL INTEGRAL IMAGING AND DISPLAY SYSTEM USING VARIABLE FOCAL LENGTH LENS

REFERENCE TO RELATED APPLICATIONS

This application is a continuation-in-part of, and claims priority to U.S. patent application Ser. No. 10/778,281, filed Feb. 13, 2004 now U.S. Pat. No. 7,077,523, U.S. patent application Ser. No. 10/822,414, filed Apr. 12, 2004 now U.S. Pat. No. 7,068,416, U.S. patent application Ser. No. 10/855,554, filed May 27, 2004 now U.S. Pat. No. 6,970,284, U.S. patent application Ser. No. 10/855,715, filed May 27, 2004 now U.S. Pat. No. 7,031,046, U.S. patent application Ser. No. 10/855,287, filed May 27, 2004 now U.S. Pat. No. 6,934,072, U.S. patent application Ser. No. 10/857,796, filed May 28, 2004 now U.S. Pat. No. 6,934,073, U.S. patent application Ser. No. 10/857,714, filed May 28, 2004, U.S. patent application Ser. No. 10/857,280, filed May 28, 2004 now U.S. Pat. No. 6,999,226, U.S. patent application Ser. No. 10/872,241, filed Jun. 18, 2004, U.S. patent application Ser. No. 10/893,039, filed Jul. 16, 2004, all of which are hereby incorporated by reference.

FIELD OF THE INVENTION

The present invention relates to optical systems in general and more specifically to three-dimensional imaging and display systems.

BACKGROUND OF THE INVENTION

Three-dimensional (3-D) imaging and display using two-dimensional (2-D) display devices has been attempted using various techniques. Stereoscopic techniques can display large images with high resolution. However, stereoscopic techniques typically require that the viewer wear special glasses to have a 3-D visual effect. Furthermore, stereoscopic techniques provide viewers with only horizontal parallax and a limited number of viewpoints. Additionally, viewers using stereoscopic glasses may suffer visual fatigue due to convergence-accommodation conflict.

Holography has also been used for 3-D displays. Using this technique, true 3-D images with full parallax and continuous viewing points may be produced using diffraction gratings. However, to obtain a proper grating, coherent light is needed when the hologram is recorded. Alternatively, computer-generated holograms can be made, but this approach requires lengthy computation time. Therefore, it is difficult to obtain large, color, 3-D displays using holography.

Integral imaging, or real-time integral photography, displays 3-D images in space by crossing incoherent light rays from 2-D elemental images, using a lenslet array. Like holography, integral imaging produces true 3-D images with full parallax and continuous viewing points. However, because lenslet arrays are used, the viewing angle, depth of focus, and resolution of the 3-D images is limited. Additionally, 3-D images produced in direct pick-up integral imaging are pseudoscopic (reversed-depth) images.

Figure 1:
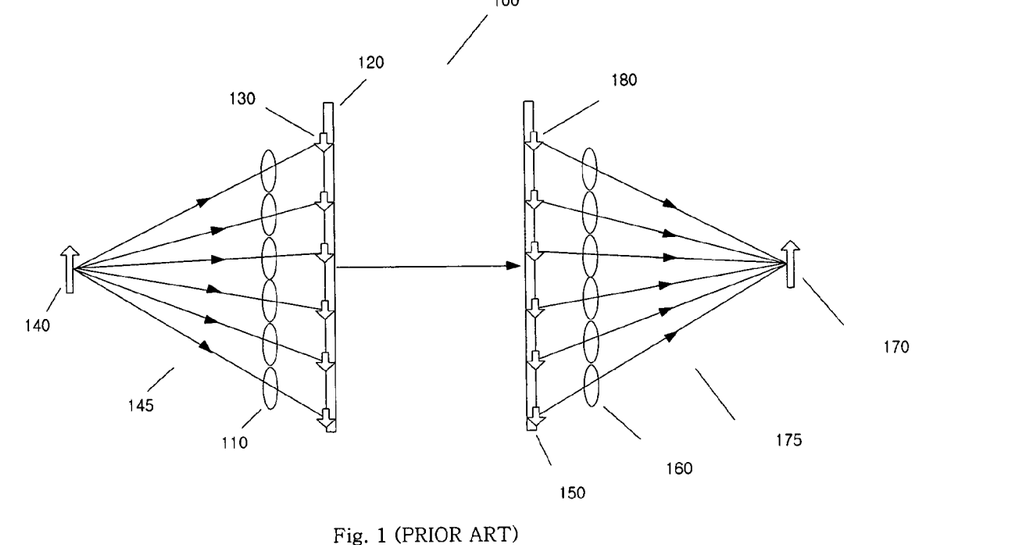
FIG. 1 depicts one embodiment of a prior art integral imaging and display system.

FIG. 1 depicts one embodiment of a prior art integral imaging and display system 100. The system 100 includes an imaging system 145 and a display system 175. The imaging system 145 includes a lens array 110 and an imaging sensor 120. The lens array 110 focuses images of an object 140 onto the image sensor 120, producing elemental images. The display system 175 includes a display panel 150 and a lens array 160. The display panel 150 generates 2-D elemental images 170 that are focused by the lens array 160 into a reconstructed 3-D image 170.

Figure 2:
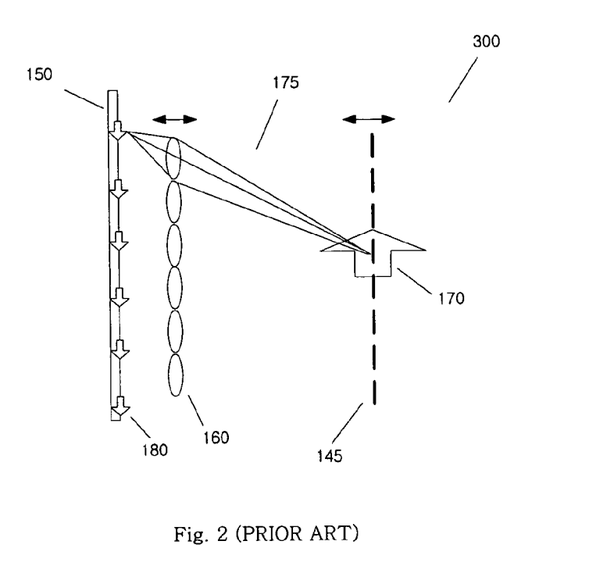
FIG. 2 depicts an embodiment of a prior art display system 175 to increase the depth range of the 3D image.

FIG. 2 depicts an embodiment of a prior art display system 175 to increase the depth range of the 3D image 170. As shown in FIG. 2, to increase the depth range requires macromovement of the lens array 160.

Figure 3:
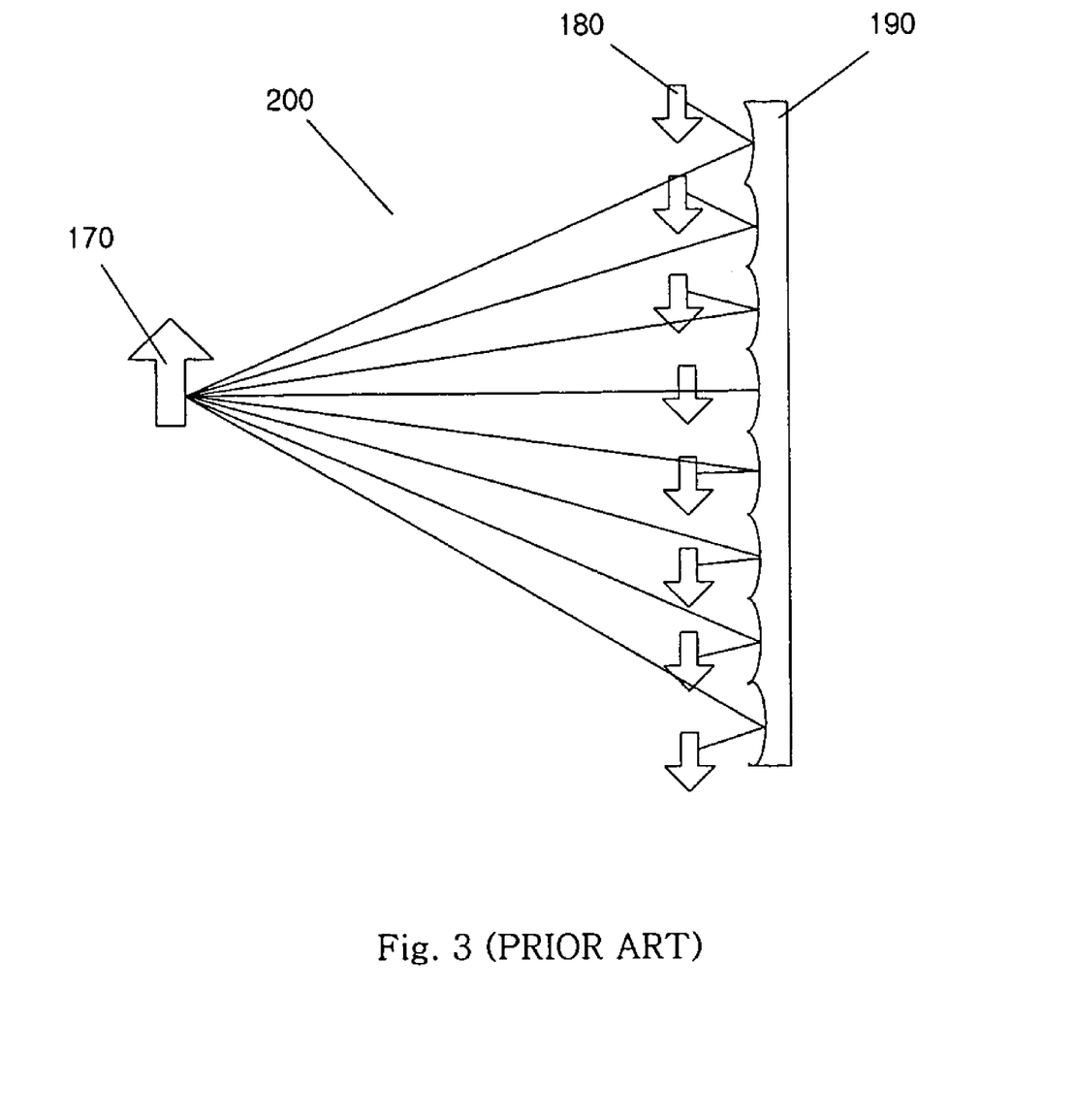
FIG. 3 depicts an embodiment of a prior art display system, using a concave mirror array.

FIG. 3 depicts an embodiment of a prior art display system 200, that uses a concave mirror array 190 instead of a lens array.

A similar approach to that found in FIG. 3 uses a micro-convex mirror array. This technique is described in "Three-dimensional projection integral imaging using micro-convex mirror arrays" by Ju-Seog Jang and Bahram Javidi. Use of micro-convex mirror arrays may increase the viewing angle, because the micro-convex mirrors can be produced with a small f number (the ratio of the focal length of the lens to its effective aperture) with negligible aberration. Furthermore, when elemental images obtained from direct camera pickup with a 2-D image sensor and a lenslet array, 3-D orthoscopic virtual images are displayed. Flipping-free viewing of 3-D images is thus possible, even if optical barriers are not used, because each elemental image is projected only onto its corresponding micro-convex mirror. However, this technique using a micro-convex mirror array allows for only limited depth of focus for displayed 3-D images. The limitation to the depth of focus in turn limits the depth range of the displayed image.

Therefore, what is needed is an integral imaging and display system that provides improved depth range for 3-D images.

SUMMARY OF INVENTION

The present invention addresses the problems of the prior art and provides a three-dimensional (3-D) integral imaging and display system using a variable focal length lens.

In one embodiment, a three-dimensional (3-D) display system includes at least one two-dimensional (2-D) display device, configured to display at least one two-dimensional image. The display system also includes an array of micromirror array lenses optically coupled to the display device, each micromirror array lens of the array of micromirror array lenses placed at a different location with respect to the display device, configured to focus the at least one two-dimensional image from each different location to provide a three-dimensional (3-D) image.

In one aspect, the display device is a two-dimensional display panel. In another aspect, the display device is a projector. In another aspect, each micromirror array lens of the array of micromirror array lenses is configured to have its focal length adjusted to increase a depth range of the three-dimensional image. In another aspect, the display system also includes a beam splitter, optically coupled to the display device and the array of micromirror array lenses, configured to change a direction of light beams emitted by the display device by 90° to simulate an in-line optical arrangement. In another aspect, each micromirror array lens of the array of micromirror array lenses is a concave micromirror array lens. In another aspect, each micromirror array lens of the array of micromirror array lenses is a convex micromirror array lens.

In another embodiment, a three-dimensional imaging system includes an array of micromirror array lenses optically coupled to an image sensor, each micromirror array lens of the array of micromirror array lenses placed at a different location with respect to a three-dimensional object, configured to focus images of the three-dimensional object from each different location onto the image sensor. The image sensor is optically coupled to the array of micromirror array lenses and configured to sense the images of the three-dimensional object focused by the array of micromirror array lenses and to provide an image data signal.

In one aspect, each micromirror array lens of the array of micromirror array lenses is configured to have its focal length adjusted to focus images of the three-dimensional object from each different location onto the image sensor. In another aspect, the imaging system also includes a beam splitter, optically coupled to the image sensor and the array of micromirror array lenses, configured to change a direction of light beams focused by the array of micromirror array lenses by 90° to simulate an in-line optical arrangement. In another aspect, each micromirror array lens of the array of micromirror array lenses is a concave micromirror array lens. In another aspect, each micromirror array lens of the array of micromirror array lenses is a convex micromirror array lens.

In another embodiment, a three-dimensional imaging and display system includes a first array of micromirror array lenses optically coupled to an image sensor, micromirror array lenses of the first array of micromirror array lenses placed at first different locations with respect to a three-dimensional object, configured to focus images of the three-dimensional object from the first different locations onto the image sensor. The image sensor is optically coupled to the first array of micromirror array lenses, configured to sense the images of the three-dimensional object focused by the first array of micromirror array lenses and to provide an image data signal to a display device. The display device is communicatively coupled to the image sensor, configured to display at least one two-dimensional image in response to the image data signal. The imaging and display system also includes a second array of micromirror array lenses optically coupled to the display device, micromirror array lenses of the second array of micromirror array lenses placed at second different locations with respect to the display device, configured to focus the at least one two-dimensional image from the second different locations to provide a three-dimensional image.

The advantages of the present invention include increased viewing angles and wide depth range of three-dimensional images.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

A three-dimensional (3-D) integral imaging and display system using a variable focal length lens (optical system) is provided. The variable focal length lens is a micromirror array lens, capable of having its focal length adjusted by translation and/or rotation of each micromirror in the micromirror array lens, as described in U.S. patent application Ser. Nos. 10/855,554, 10/855,715, 10/855,287, 10/857,796, 10/857,714, 10/857,280, all of which are hereby incorporated by reference. The micromirrors may be concave or convex. By using a micromirror array lens for imaging and display, increased viewing angles and wide depth range of three-dimensional images is provided.

In the various embodiments of display systems described herein, various types of two-dimensional (2-D) display devices (display devices) may be used, such as display panels and/or projectors. Each type of display device is optically coupled to an array of micromirror array lenses and is configured to display two-dimensional images (elemental images).

Figure 4A:
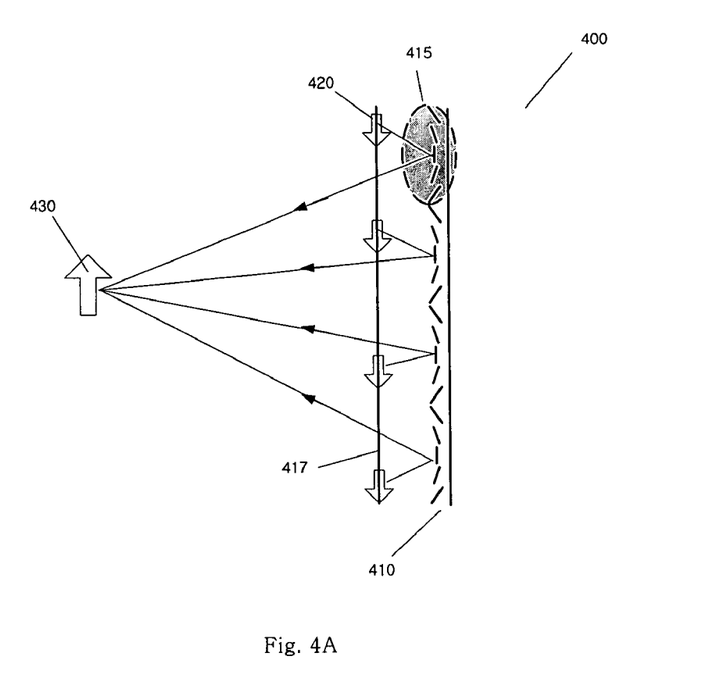
FIG. 4A depicts a three-dimensional display system using an array of concave micromirror array lenses, according to an embodiment of the invention.

FIG. 4A depicts a three-dimensional display system 400 using an array of concave micromirror array lenses, according to an embodiment of the invention. In the embodiment, the display system 400 includes a display device in the form of a two-dimensional display panel (display panel) 417, configured to display a two-dimensional image (elemental image) 420. The display system 400 also includes an array of micromirror array lenses 410, optically coupled to the display panel 417. The location of the display panel 417 shown in FIG. 4A is exemplary only. The display panel 417 may be located in any location that is suitable for proper optical coupling to the array of micromirror array lenses. Each micromirror array lens 415 of the array of micromirror array lenses 410 is placed at a different location with respect to the display panel 417 and is configured to focus the two-dimensional image from each different location to provide a three-dimensional (3-D) image (integrated image) 430. In the embodiment depicted in FIG. 4A, each micromirror array lens 415 of the array of micromirror array lenses 410 is a concave micromirror array lens. Using a concave micromirror array lens enables a three-dimensional pseudoscopic real image to be displayed.

Figure 4B:
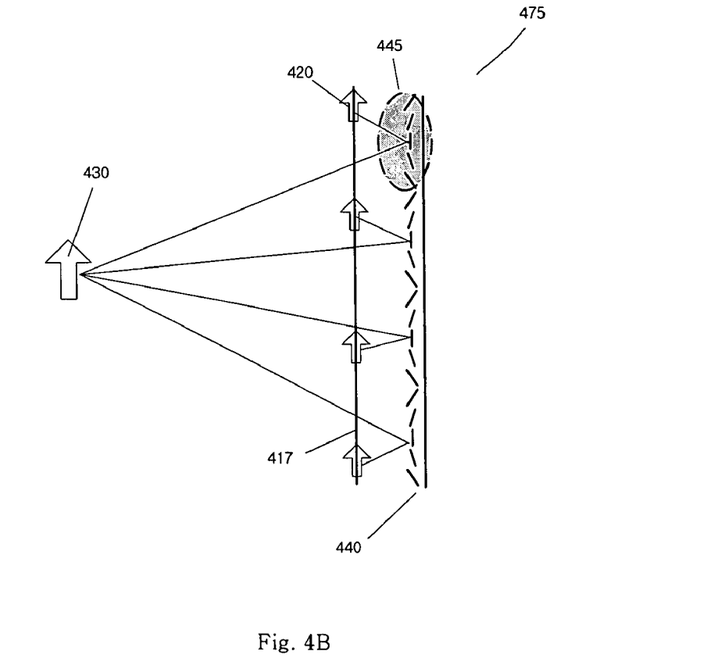
FIG. 4B depicts a three-dimensional display system using an array of convex micromirror array lenses, according to an embodiment of the invention.

FIG. 4B depicts a three-dimensional display system 475 using an array of convex micromirror array lenses, according to an embodiment of the invention. In the embodiment depicted in FIG. 4B, each micromirror array lens 445 of the array of micromirror array lenses 440 is a convex micromirror array lens. Using a convex micromirror array lens enables a three-dimensional orthoscopic virtual image to be displayed.

Figure 4C:
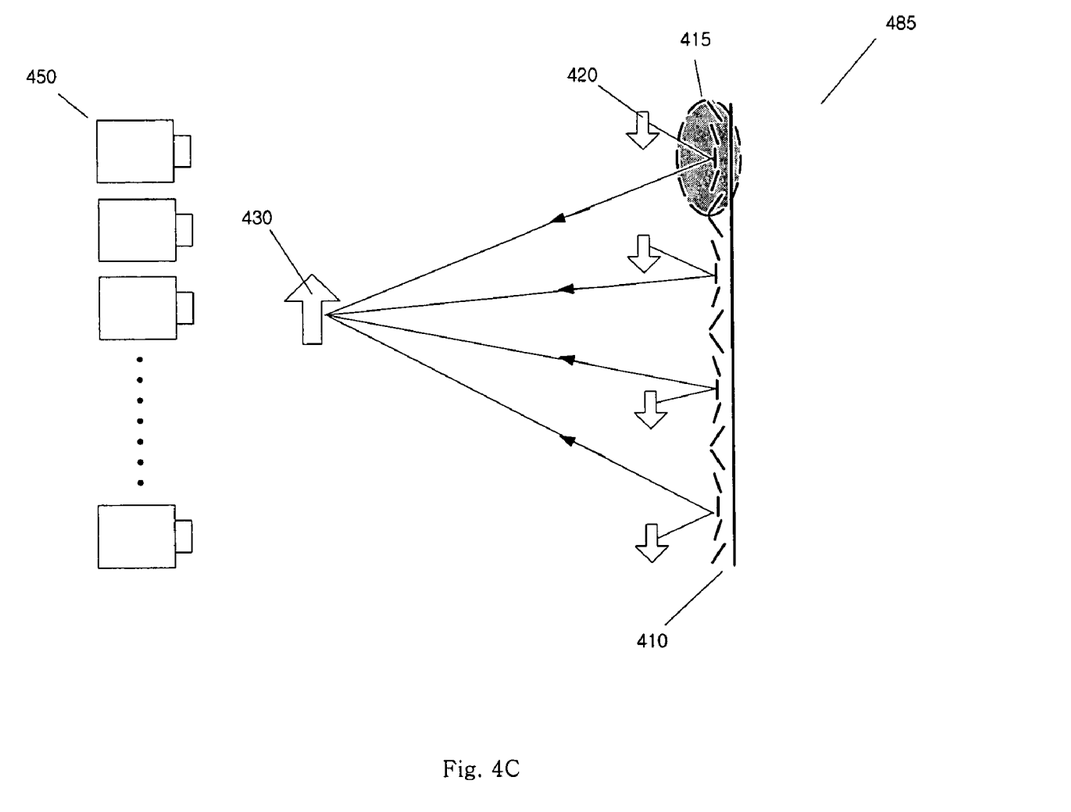
FIG. 4C depicts a three-dimensional display system using an array of micromirror array lenses, according to another embodiment of the invention

FIG. 4C depicts a three-dimensional display system 485 using an array of micromirror array lenses, according to another embodiment of the invention. In the embodiment, the display system 485 includes a display device in the form of projectors 450. The projectors 450 are optically coupled to the array of micromirror array lenses 410 and are configured to display the two-dimensional images (elemental images) 420 which are used by the array of micromirror array lenses 410 to generate the three-dimensional image (integrated image) 430. The location of the projectors 450 shown in FIG. 4C are exemplary only. The projectors 450 may be located in any location that is suitable for proper optical coupling to the array of micromirror array lenses 410. The display panel 417 is not shown in FIG. 4C because it may not be necessary when the projectors 450 are used. Any number of the projectors 450 may be used in conjunction with the display system 485. Although a concave micromirror array lens is depicted in FIG. 4C, a convex micromirror array lens may be used.

Figure 5:
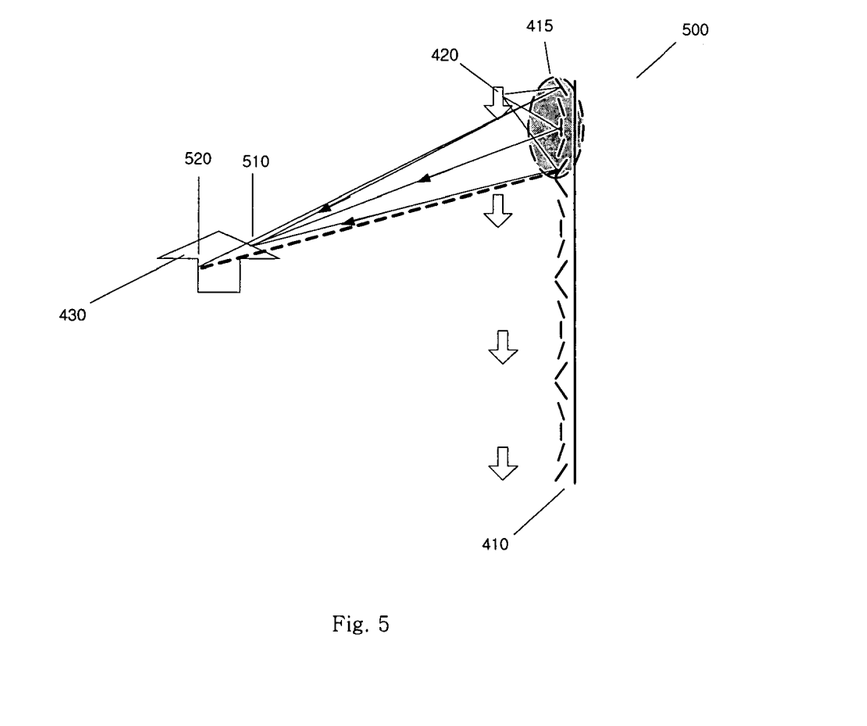
FIG. 5 is a schematic representation showing how the depth range of a three-dimensional image is increased by changing the focal length of a micromirror array lens, according to an embodiment of the invention.

FIG. 5 is a schematic representation showing how the depth range of a three-dimensional image is increased by changing the focal length of a micromirror array lens, according to an embodiment of the invention. As shown in FIG. 5, each micromirror array lens 415 of the array of micromirror array lenses 410 is adjusted (by translation and/or rotation of corresponding micromirrors) to change the focal length of the micromirror array lens 415. By changing the focal length of the micromirror array lens 415, multiple focus depths 510 and 520 of the integrated image 430 are provided. Thusly, the depth range of the integrated image 430 is increased.

Figure 6:
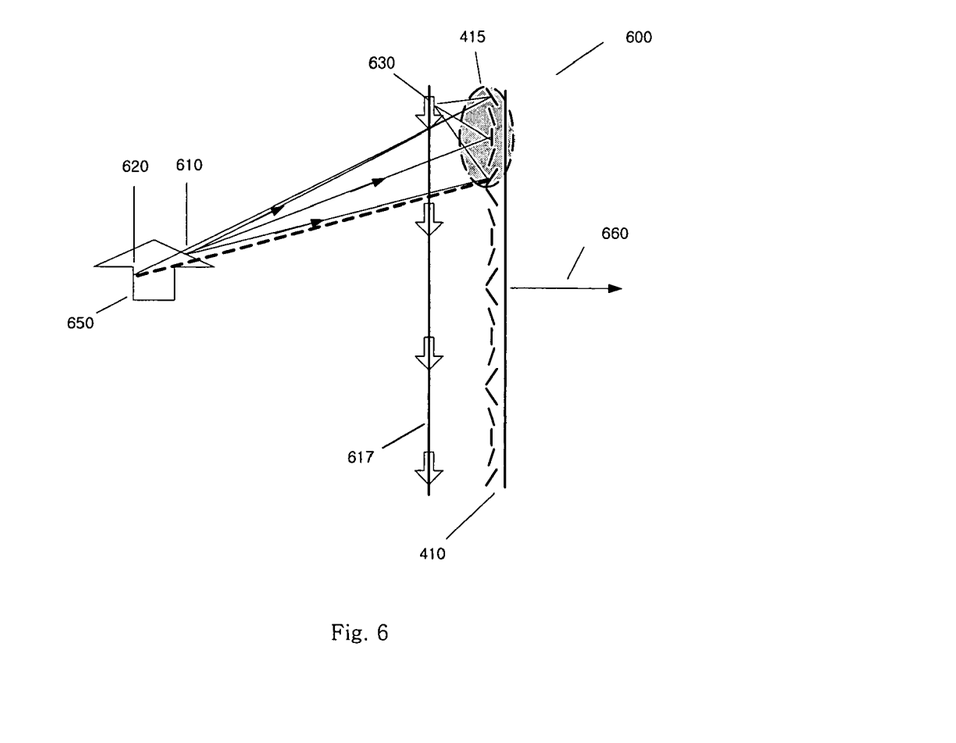
FIG. 6 depicts a three-dimensional imaging system using an array of micromirror array lenses, according to an embodiment of the invention.
Figure 8:
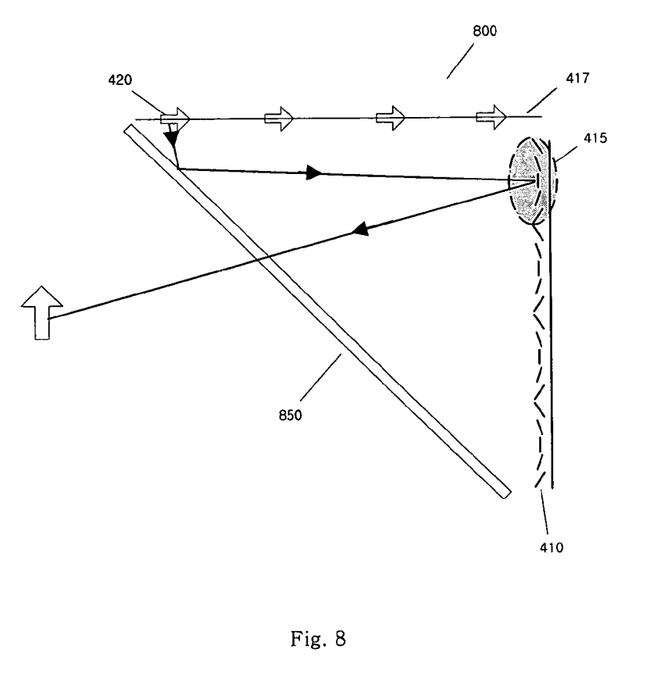
FIG. 8 depicts a three-dimensional display system using an array of micromirror array lenses and a beam splitter, according to an embodiment of the invention.

FIG. 6 depicts a three-dimensional imaging system 600 using an array of micromirror array lenses, according to an embodiment of the invention. In the embodiment, the imaging system 600 includes an array of micromirror array lenses 410 optically coupled to an image sensor 617. Each micromirror array lens 415 of the array of micromirror array lenses 410 is placed at a different location with respect to a three-dimensional object 650 and is configured to focus images of the three-dimensional object 650 from each different location onto the image sensor 617 to generate elemental images 630. The image sensor 617 is optically coupled to the array of micromirror array lenses 410 and is configured to sense the images of the three-dimensional object 650 focused by the array of micromirror array lenses 410 and to provide an image data signal 660. The location of the image sensor 617 shown in FIG. 6 is exemplary only. The image sensor 617 may be located in any location that is suitable for proper optical coupling to the array of micromirror array lenses 410. In one embodiment, a beam splitter, such as that described with reference to FIG. 8 is used in combination with the image sensor 617. In such case, the beam splitter is optically coupled to the image sensor and the array of micromirror array lenses and configured to change a direction of light beams emitted by the object.

As shown in FIG. 6, each micromirror array lens 415 of the array of micromirror array lenses 410 is configured to have its focal length adjusted (as described above with reference to FIG. 5) to focus images of the three-dimensional object 650 from each different location onto the image sensor. By adjusting the focal length of the micromirror array lens 415, the micromirror array lens 415 may focus on multiple points 610 and 620 on the three-dimensional object 650. In the embodiment depicted in FIG. 6, each micromirror array lens 415 of the array of micromirror array lenses 410 is a concave micromirror array lens. In another embodiment, each micromirror array lens is a convex micromirror array lens.

Figure 7:
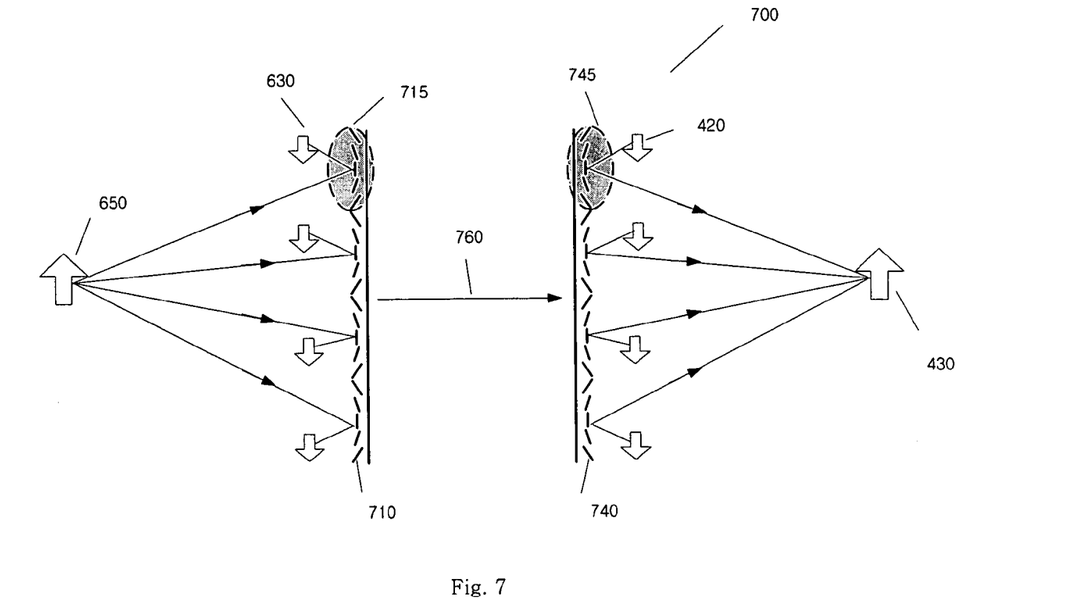
FIG. 7 depicts a three-dimensional imaging and display system using arrays of micromirror array lenses, according to an embodiment of the invention.

FIG. 7 depicts a three-dimensional imaging and display system 700 using arrays of micromirror array lenses, according to an embodiment of the invention. In the embodiment, the optical imaging and display system 700 includes a first array of micromirror array lenses 710 optically coupled to an image sensor. Micromirror array lenses 715 of the first array of micromirror array lenses 710 are placed at first different locations with respect to a three-dimensional (3-D) object 650 and configured to focus images of the three-dimensional object from the first different locations onto the image sensor. The image sensor is optically coupled to the first array of micromirror array lenses 710 and is configured to sense the images of the three-dimensional object 650 focused by the first array of micromirror array lenses 710 and to provide an image data signal 760 to a display panel. The display panel is communicatively coupled to the image sensor and is configured to display a two-dimensional (elemental) image 420 in response to the image data signal 760. A second array of micromirror array lenses 740 is optically coupled to the display panel. Micromirror array lenses 745 of the second array of micromirror array lenses 740 are placed at second different locations with respect to the display panel and configured to focus the two-dimensional image from the second different locations to provide a three-dimensional (integrated) image 430.

FIG. 8 depicts a three-dimensional display system 800 using an array of micromirror array lenses and a beam splitter, according to an embodiment of the invention. As shown in FIG. 8, the display system 800 includes a beam splitter 850, optically coupled to the display panel 417 and the array of micromirror array lenses 410, configured to change a direction of light beams emitted by the display panel 417. Because reflected light may be blocked by the display panel since the array of micromirror array lenses 410 is reflective type lens, the beam splitter 850 may be used to construct a display device that does not block the reflected light. A beam splitter is placed with 45° or any other angle to prevent the reflected light from being blocked.

The advantages of the present invention include increased viewing angles and wide depth range of three-dimensional images.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. An optical system comprising a display system, the display system including:

at least one two-dimensional (2-D) display device, configured to display two-dimensional images (elemental images) and;

an array of micromirror array lenses optically coupled to the display device;

wherein each micromirror array lens of the array of micromirror array lenses placed at a different location with respect to the display device, wherein the array of micromirror array lenses is configured to focus the two-dimensional images (elemental images from different locations) to generate three-dimensional image (integral image), wherein the array of micromirror array lenses is configured to have its focal length adjusted to increase viewing angles and depth range of the three-dimensional image.

2. The optical system of claim 1, wherein:
the display device is a two-dimensional display panel.

3. The optical system of claim 1, wherein:
the display device is a projector.

4. The optical system of claim 1, wherein:
the each micromirror array lens of the array of micromirror array lenses is configured to have its focal length adjusted to increase a depth range of the three-dimensional image.

5. The optical system of claim 1, further comprising:
a beam splitter, optically coupled to the display device and the array of micromirror array lenses, configured to change a direction of light beams emitted by the display device.

6. The optical system of claim 1, wherein:
the each micromirror array lens of the array of micromirror array lenses is a concave micromirror array lens.

7. The optical system of claim 4, wherein:
the each micromirror array lens of the array of micromirror array lenses is a concave micromirror array lens.

8. The optical system of claim 5, wherein:
the each micromirror array lens of the array of micromirror array lenses is a concave micromirror array lens.

9. The optical system of claim 1, wherein:
the each micromirror array lens of the array of micromirror array lenses is a convex micromirror array lens.

10. The optical system of claim 4, wherein:
the each micromirror array lens of the array of micromirror array lenses is a convex micromirror array lens.

11. The optical system of claim 5, wherein:
the each micromirror array lens of the array of micromirror array lenses is a convex micromirror array lens.

12. An optical system comprising an imaging system, the imaging system including:
an array of micromirror array lenses optically coupled to an image sensor, each micromirror array lens of the array of micromirror array lenses placed at a different location with respect to a three-dimensional (3-D) object, configured to Locus images of the three-dimensional object from each different location onto the image sensor; and
the image sensor, optically coupled to the array of micromirror array lenses, configured to sense the images of the three-dimensional object focused by the array of micromirror array lenses and to provide an image data signal.

13. The optical system of claim 12, wherein:
The each micromirror array lens of the array of micromirror array lenses is configured to have its focal length adjusted to focus images of the three-dimensional object from each different location onto the image sensor.

14. The optical system of claim 12, further comprising:
a bean splitter, optically coupled to the image sensor and the array of micromirror array lenses, configured to change a direction of light beams emitted by the object.

15. The optical system of claim 12, wherein:
the each micromirror array lens of the array of micromirror array lenses is a concave micromirror array lens.

16. The optical system of claim 13, wherein:
the each micromirror array lens of the array of micromirror array lenses is a concave micromirror array lens.

17. The optical system of claim 12, wherein:
the each micromirror array lens of the array of micromirror array lenses is a convex micromirror array lens.

18. The optical system of claim 13, wherein:
the each micromirror array lens of the array of micromirror array lenses is a convex micromirror array lens.

19. An optical imaging and display system, comprising:
a first array of micromirror array tenses optically coupled to an image sensor, micromirror array lenses of the first array of micromirror array lenses placed at first different locations with respect to a three-dimensional (3-D) object, configured to focus images of the three-dimensional object from the first different locations onto the image sensor;
the image sensor, optically coupled to the first array of micromirror array lenses, configured to sense the images of the three-dimensional object focused by the first array of micromirror array lenses and to provide an image data signal to a display device;
the display device, communicatively coupled to the image sensor, configured to display at least one two-dimensional (2-D) image in response to the image data signal;
a second array of micromirror array lenses optically coupled to the display device, micromirror array lenses of the second array of micromirror array lenses placed at second different locations with respect to the display device, configured to focus the at least one two-dimensional image front the second different locations to provide a three-dimensional image.

20. The optical imaging and display system of claim 19, wherein:
the micromirror array lenses of the first array of micromirror array lenses are concave micromirror array lenses.

21. The optical imaging and display system of claim 19, wherein:
the micromirror array lenses of the second array of micromirror array lenses are concave micromirror array lenses.

22. The optical imaging and display system of claim 19, wherein:
the micromirror array lenses of the first array of micromirror array lenses are convex micromirror array lenses.

23. The optical imaging and display system of claim 19, wherein:
the micromirror array lenses of the second array of micromirror array lenses are convex micromirror array lenses.

* * * * *